Patented Oct. 30, 1945

2,387,994

UNITED STATES PATENT OFFICE 2,387,994

ISOMERIZATION OF 1-OLEFINS TO 2-OLEFINS

John C. Hillyer, Bartlesville, Okla., assignor to Phillips Petroleum Company, a corporation of Delaware No Drawing. Application January 2, 1941, Serial No. 372,921

7 Claims. (Cl. 260—683.2)

This invention relates to a process for the catalytic isomerization of olefinic hydrocarbons, and more specifically to an improved catalyst and process for the conversion of alpha-olefins to beta-olefins in hydrocarbon mixtures in the vapor phase at elevated temperatures. The provision of such a catalyst and process is therefore, an object of the present invention. Other purposes and objects will be apparent from a consideration of the following specification.

Alpha olefins, generally referred to as 1-olefins, undergo an isomerization reaction whereby the unsaturated linkage migrates toward the center of the carbon chain and beta or 2-olefins are formed. In the case of the normal butenes, this reaction may be represented by the equation

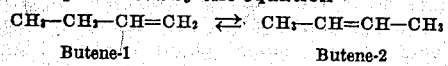

Butene-1          Butene-2

The equilibrium concentrations at various temperatures are indicated in the following tabulation:

| Temperature, °F. | Concentration in mol per cent ||
|---|---|---|
|  | Butene-1 | Butene-2 |
| 80 | 2.9 | 97.1 |
| 260 | 7.7 | 92.3 |
| 440 | 13.7 | 86.3 |
| 620 | 19.8 | 80.2 |
| 800 | 25.6 | 74.4 |
| 980 | 30.3 | 69.7 |
| 1,160 | 34.9 | 65.1 |
| 1,340 | 38.5 | 61.5 |

It has been found that this reaction is of the time-equilibrium type. In other words, butene-1 is converted gradually into butene-2, or butene-2 is converted gradually into butene-1 until the concentration of the respective components reach the equilibrium concentrations noted in the above table at various temperatures. Since the rate of conversion of one isomer to the other depends upon the isomerization reaction velocity and on the time allowed for the reaction, it is evident that in any commercial operation equilibrium concentrations are attainable only when suitable treating conditions can be met. From the above table it is seen that low temperatures favor the higher concentrations of butene-2, whereas high temperatures give maximum concentrations of butene-1.

Many attempts have been made in the past to convert one of the isomers to the other by thermal methods but the rate of reaction is so low at the lower temperature levels that butene-1 cannot be converted to any appreciable extent into butene-2 by such methods. Some attempt has been made, also, to control the rate of the isomerization reaction in the lower temperature range by the use of catalysts of the alkaline type such as calcium oxide, sodium hydroxide, and soda lime; and of the neutral type such as aluminum phosphate, aluminum sulfate, alums and zinc chloride. The results have usually been quite unsatisfactory because (1) the catalysts have not been sufficiently active to greatly increase the reaction velocity (2) the catalysts have tended to catalyze polymerization of the olefins to such a great extent that the conversion to dimers was the principal reaction rather than the isomerization. Some effort has been directed, also, to the use of concentrated solutions of the mineral acids but these solutions have the great disadvantage of being active polymerization catalysts with the result that the major proportion of the olefins may be converted to polymers.

I have now discovered that certain catalysts may be prepared which are entirely satisfactory for the rapid isomerization of olefins at relatively low temperatures and which at the same time show very little polymerizing activity. I have found that these catalysts may be prepared by impregnating carriers with aqueous acid solutions of certain non-volatile strong mineral acids in such manner as to have a controlled maximum acid content.

I have found further that the acid concentration of the isomerization catalyst may readily be controlled at the desired level by adding to the hydrocarbon vapor stream ahead of the catalyst a controlled quantity of water vapor, usually a proportion equivalent to the partial pressure of water vapor over the acid solution at the operating temperature. In this way the catalyst is maintained at substantially its original dilution, and a very rapid isomerization reaction occurs, making possible the use of low temperatures favorable to the formation of 2-olefins while loss of olefin through polymerization is almost wholly eliminated.

I have found that the isomerization reaction velocity induced by such diluted acid catalysts is satisfactory if a sufficient quantity of the acid solution be present. The total quantity of acid present seems to be an important, although not the sole factor influencing the reaction rate. Thus, when small total quantities of acid, such as 0.5 to 1.0% by weight of the carrier are used, even in concentrated form, the reaction rate is noticeably lower. The quantity of acid present has a direct bearing on the reaction rate, up to such quantities as produce equilibrium conversion in the contact time allowed.

The use of dilute acid solutions as catalysts has not heretofore been practical because of the rapid dehydration which takes place as the hot hydrocarbon vapor stream passes over the catalyst. The operating temperatures are high enough to cause the partial pressure of water vapor over the dilute acid solutions to be fairly high and the flowing gas stream very rapidly dehydrates the solution to the concentrated acid form or maximum boiling solution. Polymerization then becomes the chief reaction with rapid consumption of the olefins, and the catalyst is unsatisfactory for isomerization. However, when water vapor is added to the gas stream charged to the catalyst the rate of dehydration is reduced as far as desired or even reversed. If the partial pressure of water vapor added is substantially equal to the partial pressure of water vapor over the acid solution used, no dehydration occurs.

I have found further that the presence of water vapor in the hydrocarbon gas stream has no unfavorable effect upon the isomerization reaction, but acts as an inert diluent. Therefore, it is possible to make and maintain a dilute acid catalyst which gives good conversions of 1-olefins to 2-olefins. The advantage of this catalyst is that undesirable polymerization reactions are suppressed by the presence of this water vapor; and therefore, not only are the yields of 2-olefins per pass improved but the ultimate or recycle yield is very greatly increased.

In one specific embodiment, the invention comprises passing a stream of butene-1 over a catalyst prepared by impregnating porcelain chips with 5 to 20 per cent by weight of a 75 per cent sulfuric acid solution. The catalyst is maintained at a temperature of 250 to 260° F., and water vapor is added to the butene before entering the catalyst. From 90 to 115 mm. partial pressure of water is required at these temperatures to balance the partial pressure of water vapor over 75 per cent sulfuric acid solution which at atmospheric pressure (760 mm.) is equivalent to 12 to 15 per cent of the total volume of the gas stream. The gas is passed over the catalyst at flow rates in the range of 0.5 to 5 liquid volumes of charge per hour per volume of catalyst. The conversion to butene-2 corresponds to substantially concentration equilibrium, and loss to heavy polymer is of the order of less than 10 per cent of the olefins.

Materials which may be used as supports or carriers for the acid solutions comprise those porous materials which are substantially inert toward the mineral acids. Among those which have been found to be particularly useful are porcelain, coke, and pumice. Silicates, infusorial earth, and other highly porous, non-reactive minerals may also be used.

The total quantity of aqueous acid solutions which is added to the above-mentioned carriers varies somewhat with the adsorptive capacity of the carrier. Usually with weak adsorbents such as porcelain, pumice and the like, 5 to 20 per cent by weight of acid solution is added, and the maximum is regulated to prevent the mechanical loss of acid solution from the carrier. In general, with acid solutions containing 50–80 per cent by weight of acid, suitable isomerization velocity is obtained with catalysts containing 5 per cent or more of said solutions.

Acids which are suitable for this conversion are the so-called non-volatile strong mineral acids, or those which have very low vapor pressures even at elevated temperatures. Ordinarily the choice is limited in practice to the two most common acids of this type, namely sulfuric and phosphoric acids. Although both of these acids produce satisfactory catalysts, sulfuric acid is ordinarily less expensive and I frequently prefer to use it.

The concentration of the acid solution used is of course open to considerable variation. In practice, however, I have found that certain factors tend to restrict the range of economic concentrations to a rather narrow range. Polymerization becomes noticeable at acid concentrations of about 85 per cent or higher, so that ordinarily about 80 per cent represents the maximum acid concentration. On the other hand, the vapor pressure of water in equilibrium with solution containing less than 50–60 per cent acid becomes appreciable at temperatures above 200° F. and the volume of water vapor which it is necessary to add to maintain the acid dilution becomes a very considerable proportion of the total vapor mixture, and the cost of processing becomes excessive. Lower temperatures and/or higher percentages of water vapor in the hydrocarbon stream must therefore be used with more dilute acids. Since the isomerization reaction velocity is somewhat reduced by reducing the concentration of 1-olefins, acid strengths below 50 per cent are not always practical. If 33 per cent dilution of the hydrocarbon by water vapor be taken as an approximate maximum, corresponding to about 250 mm. partial pressure of water vapor at atmospheric pressure, then the operating temperatures range from 220 to about 400° F. when using solutions containing 60–80 per cent of sulfuric acid. Conversions which require higher temperatures are carried out with the more concentrated acid solution catalysts, while those which can be carried out at the lower temperature may make use of the more dilute acid solutions. The values for phosphoric acid solutions are similarly determined from vapor pressure tables for the acid.

Temperatures of the order of 220 to 600° F. are satisfactory for isomerizing butene-1 to butene-2. The lower temperatures may be used if either a larger total quantity of acid, more contact time, or both are used. In this way 50 to 60 per cent acid may be used. At or above 300° F. it is most practical to use 70–80 per cent acid. The lower temperature range is desirable, since the equilibrium becomes more favorable to the desired 2-butene. Higher normal olefins such as pentenes and hexenes are similarly affected by temperature in the isomerization reaction.

Pressures in my process are low super-atmospheric pressures of zero to 50 pounds gage, although sub-atmospheric pressures may be used, if desired. High pressures are avoided because of the increased polymerization resulting.

Flow rates in my process are controlled according to the operating conditions, and the contact time required for equilibrium conversion. In general rates of 0.5 to 5 liquid volumes of charge per hour per volume of catalyst are satisfactory, although higher or lower rates may be used. The proper selection of operating conditions is obvious in view of the foregoing disclosure of factors affecting the isomerization reaction.

Polymerization of other unsaturated constituents of hydrocarbon mixtures containing normal olefins is also retarded in my process by the presence of water vapor. Thus, such valuable hydrocarbons as isobutene or butadiene may be recovered from hydrocarbon mixtures after isomerization over my dilute acid solution catalysts, while if concentrated acid were employed, they were almost wholly polymerized.

The following examples will serve to illustrate specific modes of carrying out the present invention, but it is to be understood that they in no way limit the invention to these specific cases.

Example I

A catalyst comprising 10 weight per cent of a solution containing 75 weight per cent of sulfuric acid on 8-14 mesh porous porcelain chips was prepared. This catalyst was maintained at 250° F. and a gas mixture containing 88 volume per cent of butene-1 and 12 volume per cent of steam was passed through at 5 pounds gage pressure, and a flow rate of 0.5 liquid volumes of charge per hour per volume of catalyst. The gas issuing was condensed and dried. Analysis showed the hydrocarbon to consist of 90 per cent butenes and 5 per cent polymer heavier than $C_5$. The butene fraction contained 92 per cent butene-2 and 8 per cent butene-1. The catalyst gave uniform results over many hours use. No acid could be detected in the product.

Example II

Butene-1 admixed with water vapor was passed over a catalyst consisting of 10 weight per cent of a solution containing 80 weight per cent of phosphoric acid on pumice. The vapor mixture contained 15 volume per cent of water vapor corresponding to a partial pressure of 150 mm. at a total pressure of 5 pounds gage. The catalyst was maintained at a temperature of 260° F., and a flow rate of 0.75 liquid volume of charge per hour per volume of catalyst was employed. The effluents were condensed and dried, and the butene fraction contained 90 per cent butene-2 and 10 per cent butene-1. About 7 per cent of the hydrocarbon charge was converted to high-boiling polymer.

Example III

The catalyst of Example I was used to isomerize pentene-1 admixed with 20 volume per cent of water vapor at atmospheric pressure, at a temperature of 300° F., and a flow rate of 0.5 liquid volume of charge per hour per volume of catalyst. The effluents were condensed and dried, and the $C_5$ fraction contained about 80 per cent of pentene-2. Polymer loss amounted to 10 per cent of the pentene charge.

While I have described my invention in a detailed manner and provided specific examples illustrating suitable modes of executing the same, it is to be understood that modifications may be made and that no limitations other than those imposed by the scope of the appended claims are intended.

I claim:

1. In a process for the isomerization of butene-1 to butene-2 in the presence of phosphoric acid, the improvement which comprises contacting butene-1 in an isomerization zone at a pressure within the range of atmospheric to 50 pounds per square inch gage and at a temperature within the range of 220 to 400° F. with phosphoric acid retained on a solid inert carrier in an aqueous solution having an acid concentration within the range of 50 to 80 per cent by weight, and supplying sufficient water vapor to the isomerization zone to maintain the acid concentration substantially constant and within the range of 50 to 80 per cent by weight.

2. In a process for the isomerization of butene-1 to butene-2 in the presence of sulfuric acid, the improvement which comprises contacting butene-1 in an isomerization zone at a pressure within the range of atmospheric to 50 pounds per square inch gage and at a temperature within the range of 220 to 400° F. with an isomerization catalyst comprising an inert, porous, adsorptive carrier impregnated with 5 to 20 per cent by weight of an aqueous solution of sulphuric acid having a concentration of 50 to 80 per cent by weight of acid, and supplying sufficient water vapor to the isomerization zone to maintain the acid concentration substantially constant and within the range of 50 to 80 per cent by weight.

3. In a process for the isomerization of 1-olefins to 2-olefins in the presence of a mineral acid selected from the group consisting of phosphoric acid and sulfuric acid, the improvement which comprises contacting 1-olefins in an isomerization zone at a pressure within the range of atmospheric to 50 pounds per square inch gage and at a temperature within the range of 220 to 400° F. with the mineral acid retained on a solid inert, porous, adsorptive carrier in an aqueous solution having an acid concentration within the range of 50 to 80 per cent by weight, said solution being retained on said carrier in the proportion of 5 to 20 per cent by weight thereof, and supplying sufficient water vapor to the isomerization zone to maintain the acid concentration substantially constant and within the range of 50 to 80 per cent by weight.

4. In a process for the isomerization of pentene-1 to pentene-2 in the presence of phosphoric acid, the improvement which comprises contacting pentene-1 in an isomerization zone at a pressure within the range of atmospheric to 50 pounds per square inch gage and at a temperature within the range of 220 to 400° F. with phosphoric acid retained on a solid inert carrier in an aqueous solution having an acid concentration within the range of 50 to 80 per cent by weight, and supplying sufficient water vapor to the isomerization zone to maintain the acid concentration substantially constant and within the range of 50 to 80 per cent by weight.

5. A process for the catalytic isomerization of 1-olefins to 2-olefins which comprises intimately contacting said 1-olefins in the vapor state at a temperature of from 220 to 400° F., a pressure of from 0 to 50 pounds per square inch gage, and a flow rate of from 0.5 to 5 liquid volumes of feed per hour per volume of catalyst and in admixture with water vapor in amount such as to give a partial pressure therein equal to the partial pressure of water vapor over the acid solution in the catalyst at the operating temperature, with an isomerization catalyst consisting of an inert porous adsorptive carrier impregnated with from 5 to 20 weight per cent of an aqueous solution of phosphoric acid having a concentration of from 50 to 80 weight per cent, and thereby effecting conversion of said 1-olefin to 2-olefin.

6. A process for the catalytic isomerization of butene-1 to butene-2 which comprises intimately contacting said butene-1 in the vapor state at a temperature of from 220 to 400° F., a pressure of from 0 to 50 pounds per square inch gage, and a flow rate of from 0.5 to 5 liquid volumes of feed per hour per volume of catalyst and in admixture with water vapor in amount such as to give a partial pressure therein equal to the partial pressure of water vapor over the acid solution in the catalyst at the operating temperature, with an isomerization catalyst consisting of an inert porous adsorptive carrier impregnated with from 5 to 20 weight per cent of an aqueous solution of phosphoric acid having a concentration of from 50 to 80 weight per cent, and thereby effecting conversion of said butene-1 to butene-2.

7. A process for the catalytic isomerization of 1-olefins to 2-olefins which comprises intimately contacting said 1-olefin in the vapor state at a temperature of from 220 to 400° F., a pressure of from 0 to 50 pounds per square inch gage, and a flow rate of from 0.5 to 5 liquid volumes of feed per hour per volume of catalyst and in admixture with water vapor in amount such as to give a partial pressure therein equal to the partial pressure of water vapor over the acid solution in the catalyst at the operating temperature, with an isomerization catalyst consisting of an inert porous adsorptive carrier impregnated with from 5 to 20 weight per cent of an aqueous solution of an acid selected from the group consisting of phosphoric and sulfuric acids, said solution having a concentration of from 50 to 80 weight per cent, and thereby effecting conversion of said 1-olefin to 2-olefin.

JOHN C. HILLYER.